United States Patent
Kang et al.

(10) Patent No.: US 9,891,480 B2
(45) Date of Patent: Feb. 13, 2018

(54) DISPLAY DEVICE

(71) Applicant: Samsung Display Co., Ltd., Yongin, Gyeonggi-Do (KR)

(72) Inventors: Jang-Mi Kang, Yongin (KR); Mee-Hye Jung, Yongin (KR); In-Jae Hwang, Yongin (KR); Il-Gon Kim, Yongin (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 14/754,951

(22) Filed: Jun. 30, 2015

(65) Prior Publication Data

US 2016/0116804 A1    Apr. 28, 2016

(30) Foreign Application Priority Data

Oct. 28, 2014   (KR) .......................... 10-2014-0147678

(51) Int. Cl.
*G02F 1/1343* (2006.01)
*G02F 1/1337* (2006.01)
*G02F 1/1362* (2006.01)

(52) U.S. Cl.
CPC .. *G02F 1/134309* (2013.01); *G02F 1/133707* (2013.01); *G02F 2001/134345* (2013.01); *G02F 2001/136218* (2013.01)

(58) Field of Classification Search
CPC ... G02F 2001/134345; G02F 1/133707; G02F 1/134309
See application file for complete search history.

(56) References Cited

U.S. PATENT DOCUMENTS

| 2006/0158576 A1* | 7/2006 | Kim ................. G02F 1/133707 349/38 |
| 2009/0066900 A1 | 3/2009 | Park et al. |
| 2010/0123845 A1 | 5/2010 | Kim et al. |
| 2011/0051059 A1 | 3/2011 | Kang et al. |
| 2011/0157537 A1* | 6/2011 | Chen ................. G02F 1/133707 349/158 |

(Continued)

FOREIGN PATENT DOCUMENTS

| KR | 1020100054344 A | 5/2010 |
| KR | 1020110024510 A | 3/2011 |

(Continued)

*Primary Examiner* — Jessica M Merlin
(74) *Attorney, Agent, or Firm* — Cantor Colburn LLP

(57) ABSTRACT

A display device includes a first substrate comprising a pixel area a first pixel electrode on the pixel area and a second pixel electrode overlapping the first pixel electrode; a second substrate including a common electrode and facing the first substrate; and a liquid crystal layer between the first substrate and the second substrate. The first pixel electrode includes first and second sides parallel to a side of the pixel area; third and fourth sides respectively extending from first ends of the first and second sides, inclined with respect to the first and second sides and parallel to each other; and fifth and sixth sides parallel to each other, and connecting the second and first sides with the third and fourth sides, respectively. An acute angle between each of the third to sixth sides, with respect to the first and second sides, exceeds about 135 degrees.

18 Claims, 5 Drawing Sheets

(56) References Cited

U.S. PATENT DOCUMENTS

| | | | | |
|---|---|---|---|---|
| 2013/0002625 | A1* | 1/2013 | Liao | G02F 1/134309 |
| | | | | 345/205 |
| 2013/0201432 | A1 | 8/2013 | Yun et al. | |
| 2014/0211142 | A1* | 7/2014 | Kim | G02F 1/133707 |
| | | | | 349/138 |
| 2014/0267962 | A1* | 9/2014 | Jung | G02F 1/134363 |
| | | | | 349/33 |
| 2015/0331266 | A1* | 11/2015 | Kang | H01L 27/1259 |
| | | | | 257/59 |
| 2016/0116810 | A1* | 4/2016 | Tae | G02F 1/134309 |
| | | | | 349/43 |

FOREIGN PATENT DOCUMENTS

| | | |
|---|---|---|
| KR | 1020130091218 A | 8/2013 |
| KR | 1020130129883 A | 11/2013 |

* cited by examiner

DISPLAY DEVICE

This application claims priority to Korean Patent Application No. 10-2014-0147678, filed on Oct. 28, 2014, and all the benefits accruing therefrom under 35 U.S.C. § 119, the entire contents of which are incorporated herein by reference in their entirety.

BACKGROUND (1) Field

The invention relates to a display device, and more particularly, to a display device with improved display quality.

(2) Description of the Related Art

In general, an image realized by a liquid crystal display device has a limited viewing angle depending on the angle from which the image is viewed due to anisotropy characteristics of liquid crystal, and a phenomenon of the image being distorted occurs. Such distortion of image may be overcome by a patterned pixel electrode and a common electrode.

When an electric field is applied to the liquid crystal, a fringe field is generated at an edge area of a patterned electrode where liquid crystal molecules are aligned in a plurality of directions.

In order to resolve the problem of limited viewing angle, the structure of pixel electrodes has been changed to various types. However, in changing the structure of a pixel electrode in order to improve the viewing angle, the manufacturing and processing technology thereof is limited, such that the transmission rate of the liquid crystal display device including the changed structure pixel electrode decreases. This decrease of the transmission rate may lead to deterioration of the display quality of the liquid crystal display device.

SUMMARY

One or more exemplary embodiment of the invention provides a display device with improved display quality.

According to an exemplary embodiment of the invention, there is provided a display device including a first display substrate including a pixel area, a first pixel electrode on the pixel area and a second pixel electrode overlapping the first pixel electrode; a second display substrate including a common electrode and facing the first display substrate; and a liquid crystal layer between the first display substrate and the second display substrate. The first pixel electrode includes first and second sides elongated parallel to a first side of the pixel area; third and fourth sides respectively elongated to extend from first ends of the first and second sides, inclined with respect to the first and second sides and parallel to each other; and fifth and sixth sides connecting the second and first sides with the third and fourth sides and being parallel to each other. An interior angle between each of the third to sixth sides, with respect to the first and second sides, exceeds about 135 degrees (°).

The display device may further include a data line elongated parallel to the first side of the pixel area; and a shielding electrode overlapping the data line. The shielding electrode may include a same material as the first pixel electrode.

Lengths of the third to sixth sides may be greater than lengths of the first and second sides, and an interior angle between the each of third to sixth sides, with respect to the first and second sides, may be or more than about 145°.

In a plan view, an open area having a diamond shape may be defined inside the first pixel electrode.

The second pixel electrode may include a first subpixel electrode overlapping the open area of the first pixel electrode; and a second subpixel electrode surrounding the first subpixel electrode to be spaced apart from the first subpixel electrode. The second pixel electrode may have a plate shape overlapping the pixel area.

In the plan view, an edge area of the first subpixel electrode of the second pixel electrode may overlap the first pixel electrode. The first subpixel electrode may include a cross-shape stem; and a plurality of first branches extending from the stem. An acute angle between the first branches and the stem may be about 35° to about 55°. A width of the stem in a direction perpendicular to an elongation direction thereof may be about 20% to about 35% of a length of the first and second sides in elongation directions thereof.

An inner edge area of the second subpixel electrode of the second pixel electrode may overlap the first pixel electrode. The second subpixel electrode may include a circumference portion having a plate shape; and a plurality of second branches extending from the circumference portion. An acute angle between the second branches and the circumference portion may be about 35° to about 55°.

An interior angle between the third and fourth sides, with respect to the fifth and sixth sides connected thereto, may be about 70° or less.

Each of the third to sixth sides may include two sub-sides. First sub-sides of the third and fourth sides may respectively extend from first ends of the first and second sides to be parallel to one another, first sub-sides of the fifth and sixth sides may extend from second ends of the first and second sides opposite to the first ends to be parallel to one another, second sub-sides of the third and fourth sides may respectively extend from distal ends of the first sub-sides of the third and fourth sides to be parallel to one another and may be respectively connected to the fifth and sixth sides, and second sub-sides of the fifth and sixth sides may respectively extend from distal ends of the first sub-sides of the fifth and sixth sides to be parallel to one another and may be respectively connected to the third and fourth sides.

The first and second sides may have a zig-zag pattern defined therein.

According to another exemplary embodiment of the invention, there is provided a display device including a first display substrate including a gate line on a first base substrate; a data line crossing and insulated from the gate line; a plurality of thin film transistors connected to the gate line and the data line; a first protection film covering the thin film transistors; the first pixel electrode arranged on the protection film connected to a first thin film transistor among the thin film transistors; a shielding electrode on the protection film and overlapping the data line; a second protection film overlapping the first pixel electrode and the shielding electrode; and a second pixel electrode on the second protection film and connected to a second thin film transistor different from the first thin film transistor among the thin film transistors. The first pixel electrode includes first and second sides elongated parallel to a first side of the pixel area; third and fourth sides respectively elongated to extend from first ends of the first and second sides, inclined with respect to the first and second sides and parallel to each other; and fifth and sixth sides connecting the second and first sides with the third and fourth sides, respectively, and being parallel to each other. An interior angle between each of the third to sixth sides, with respect to the first and second sides, exceeds about 135°.

In one or more exemplary embodiment, an electric field formed between the first and second pixel electrodes near areas of the first and second sides of the first pixel electrode has a different direction from the electric field formed in other areas.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
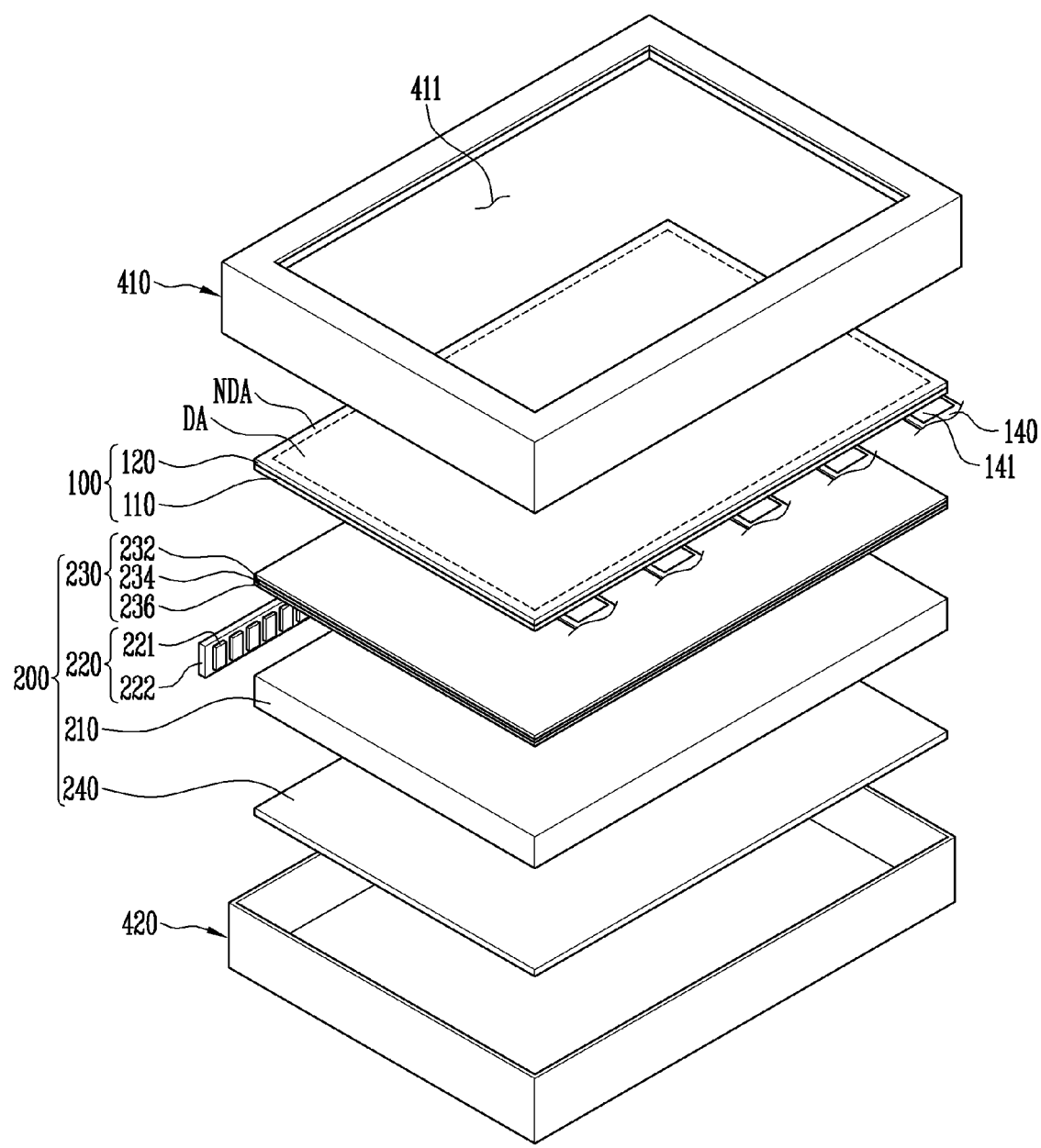
FIG. 1 is an exploded perspective view of an exemplary embodiment of a display device according to the invention.

The invention will now be described more fully hereinafter with reference to the accompanying drawings. However, the invention may be embodied in different forms and should not be construed as limited to the exemplary embodiments set forth herein. Rather, these exemplary embodiments are provided so that this disclosure will be thorough and complete, and will fully convey the scope of the exemplary embodiments to those skilled in the art.

In the drawing figures, dimensions may be exaggerated for clarity of illustration. It will be understood that when an element is referred to as being "between" two elements, it can be the only element between the two elements, or one or more intervening elements may also be present.

Exemplary embodiments are described herein with reference to cross-sectional illustrations that are schematic illustrations of exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but may include deviations in shapes that result, for example, from manufacturing. In the drawings, lengths and sizes of layers and regions may be exaggerated for clarity. Like reference numerals in the drawings denote like elements.

Terms such as 'first' and 'second' may be used to describe various components, but they should not limit the various components. Those terms are only used for the purpose of differentiating a component from other components. For example, a first component may be referred to as a second component, and a second component may be referred to as a first component and so forth without departing from the spirit and scope of the present disclosure. Furthermore, 'and/or' may include any one of or a combination of the components mentioned.

Furthermore, a singular form may include a plural from as long as it is not specifically mentioned in a sentence. Furthermore, "include/comprise" or "including/comprising" used in the specification represents that one or more components, steps, operations, and elements exist or are added.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

Relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

FIG. 1 is an exploded perspective view of an exemplary embodiment of a display device according to the invention.

Referring to FIG. 1, the display device includes display panel 100, a backlight unit 200, an upper cover 410 and a lower cover 420. Hereinafter, a liquid crystal display panel is described as the display panel 100, but the invention is not limited thereto or thereby.

The liquid crystal display panel 100 may have a shape of a rectangular plate with a long side and a short side, and may include a display area DA in which an image is displayed, and a non-display area NDA surrounding the display area DA and in which an image is not displayed. Furthermore, the liquid crystal display panel 100 may include a first display substrate 110, a second display substrate 120 facing the first display substrate 110, and a liquid crystal layer (not illustrated) between the first display substrate 110 and the second display substrate 120. Furthermore, on both of opposing exterior surfaces of the liquid crystal display panel 100, a polarizing film (not illustrated) may be attached.

In the display area DA of the first display substrate 110, a plurality of pixels (not illustrated) may be arranged in a matrix format. Herein, each pixel may include a plurality of sub pixels, and each sub pixel may display a different color. In an exemplary embodiment, for example, each sub pixel may be of any one color among red, green, blue, cyan, magenta and yellow, but the invention is not limited thereto or thereby. Therefore, light emitted from each sub pixel may be of any one color among red, green, blue, cyan, magenta and yellow. Furthermore, each pixel may include a gate line (not illustrated), a data line (not illustrated) crossing the gate line and insulated from the gate line, and a pixel electrode (not illustrated). Furthermore, each pixel may be provided with a thin film transistor (not illustrated) that is electrically connected to the gate line and the data line, and is electrically connected correspondingly to the pixel electrode. The thin film transistor may switch a driving signal provided to the corresponding pixel electrode side thereof.

In the non-display area NDA of the first display substrate 110, a sealing pattern (not illustrated) may be arranged by which the first display substrate 110 and the second display substrate 120 are combined to each other.

The second display substrate 120 may be provided with a color filter (not illustrated) that realizes a predetermined color using light provided from the backlight unit 200, and a common electrode (not illustrated) disposed on the color filter and facing the pixel electrode (not illustrated) of the first display substrate 110. Herein, the color filter may be of any one among colors of red, green, blue, cyan, magenta and yellow. In an exemplary embodiment of manufacturing the display panel 100, the color filter may be formed through a process such as evaporation or coating. In the above-described exemplary embodiment, the color filter is disposed in the second display substrate 120, but the invention is not limited thereto. In an exemplary embodiment, for example, the color filter may be disposed in the first display substrate 110 instead of the second display substrate 120.

Liquid crystal molecules of the liquid crystal layer are arranged in a certain direction by a voltage applied to the pixel electrode and the common electrode, thereby adjusting the transmission rate of the light provided from the backlight unit 200 so that the liquid crystal display panel 100 may display an image.

In the non-display area NDA, on an exterior surface of either one of the first display substrate 110 and the second display substrate 120, a signal input pad (not illustrated) may be arranged. The signal input pad is connected to a flexible circuit substrate 140 on which a driver integrated circuit ("IC") 141 is mounted, and the flexible circuit substrate 140 may be connected to an external circuit module (not illustrated). The driver IC 141 receives various control signals from the external circuit module, and outputs to the thin film transistor the driving signal that drives the liquid crystal display panel 100 in response to various control signals.

The backlight unit 200 is arranged relative to the liquid crystal display panel 100 in a direction opposite to a direction in which an image is emitted from the liquid crystal display panel 100. The backlight unit 200 may include a light guide plate 210, a light source unit 220 that includes a plurality of light sources, an optical member 230 and a reflectance sheet 240.

The light guide plate 210 is positioned below the liquid crystal display panel 100, and guides the light emitted from the light source unit 220 to emit the light therefrom toward the liquid crystal display panel 100. Especially, the light guide plate 210 overlaps at least the display area DA of the liquid crystal display panel 100. Herein, the light guide plate 210 may include an emitting surface from which the light is emitted to the liquid crystal display panel 100, a lower surface facing the emitting surface, and side surfaces that connect the emitting surface and the lower surface to each other. Furthermore, at least one of the side surfaces may be an incident surface that faces the light source unit 220 and into which the light emitted from the light source unit 220 enters the light guide plate 210. A side surface facing the incident surface may be a light reflecting surface that reflects light incident thereto.

The light source unit 220 may include a plurality of light sources 221 mounted on a printed circuit board ("PCB") 222. In an exemplary embodiment, for example, a plurality of point light sources such as light emitting diodes are mounted on the PCB 222.

Herein, the light sources 221 may emit light of a same color. In an exemplary embodiment, for example, each of the light sources 221 may emit white color light, but the invention is not limited thereto or thereby.

Furthermore, the light sources 221 may emit light of different colors. In an exemplary embodiment, for example, a first portion of the light sources 221 may emit red color light, a second portion of the light sources 221 different from the first portion thereof may emit green light, and a third portion of the light sources 221 different from the first and second portions thereof may emit blue light.

The light source unit 220 may be arranged to face at least one of the side surfaces of the light guide plate 210 to emit light to the incident surface thereof, and the light provided through the light guide plate 210 is used by the liquid crystal display panel 100 to display an image.

The optical member 230 is provided between the light guide plate 210 and the liquid crystal display panel 100. The optical member 230 plays a role of controlling the light provided from the light source unit 220 and emitted through the light guide plate 210. Furthermore, the optical member 230 may include a diffusion sheet 236, prism sheet 234 and protection sheet 232 disposed sequentially.

The diffusion sheet 236 plays a role of diffusing light emitted from the light guide plate 210. The prism sheet 234 plays a role of concentrating light diffused from the diffusion sheet 236, the light being concentrated in a direction vertical to an upper plane of the liquid crystal display panel 100. Most of the light that passed the prism sheet 234 enters the liquid crystal display panel 100 vertically with respect to the upper plane of the liquid crystal display panel 100. The protection sheet 232 is positioned on the prism sheet 234. The protection sheet 232 protects the prism sheet 234 from impact thereto from outside.

In the illustrated exemplary embodiment, the optical member 230 includes one diffusion sheet 236, one prism sheet 234 and one protection sheet 232, but there is no limitation thereto. The optical member 230 may include a plurality of at least one of the diffusion sheet 236, the prism sheet 234 and the protection sheet 232, overlapping one another. In an exemplary embodiment, one of the above-described sheets of the optical member 230 may be omitted.

The reflectance sheet 240 may be arranged below the light guide plate 210 to reflect light that is emitted from the light source unit 220 but is not provided in the liquid crystal display panel 100 direction to be leaked from the light guide plate 210, thereby re-directing and changing the leaked light path towards the liquid crystal display panel 100 direction. The reflectance sheet 240 may include a substance that reflects light. The reflectance sheet 240 is provided on the lower cover 420, and reflects the light generated from the light source unit 220. As a result, the reflectance sheet 240 increases the amount of light being provided towards the liquid crystal display panel 100.

In the illustrated exemplary embodiment, the light source unit 220 is arranged such that light is provided in a side surface direction of the light guide plate 210, but there is no limitation thereto. In an exemplary embodiment, for example, the light source unit 220 may be arranged such that light is provided from a lower surface direction of the light guide plate 210. Furthermore, in another exemplary embodiment, the light guide plate 210 may be omitted from the backlight unit 200, and the light source unit 220 may be arranged below and overlapping the liquid crystal display panel 100, so that light emitted from the light source unit 220 is directly provided to the liquid crystal display panel 100.

The upper cover 410 is provided above the liquid crystal display panel 100. The upper cover 410 may include defined therein a display window 411 that exposes the display area DA of the liquid crystal display panel 100. The upper cover 410 is combined with the lower cover 420, and supports a front surface edge of the liquid crystal display panel 100. The front surface edge of the liquid crystal display panel 100 may be disposed in the non-display area NDA thereof.

The lower cover 420 is provided below the backlight unit 200. The lower cover 420 may include defined therein space for accommodating the liquid crystal display panel 100 and the backlight unit 200. Furthermore, the lower cover 420 may be combined with the upper cover 410, and may accommodate and support the liquid crystal display panel 100 and the backlight unit 200 in the space defined therein.

Figure 2:
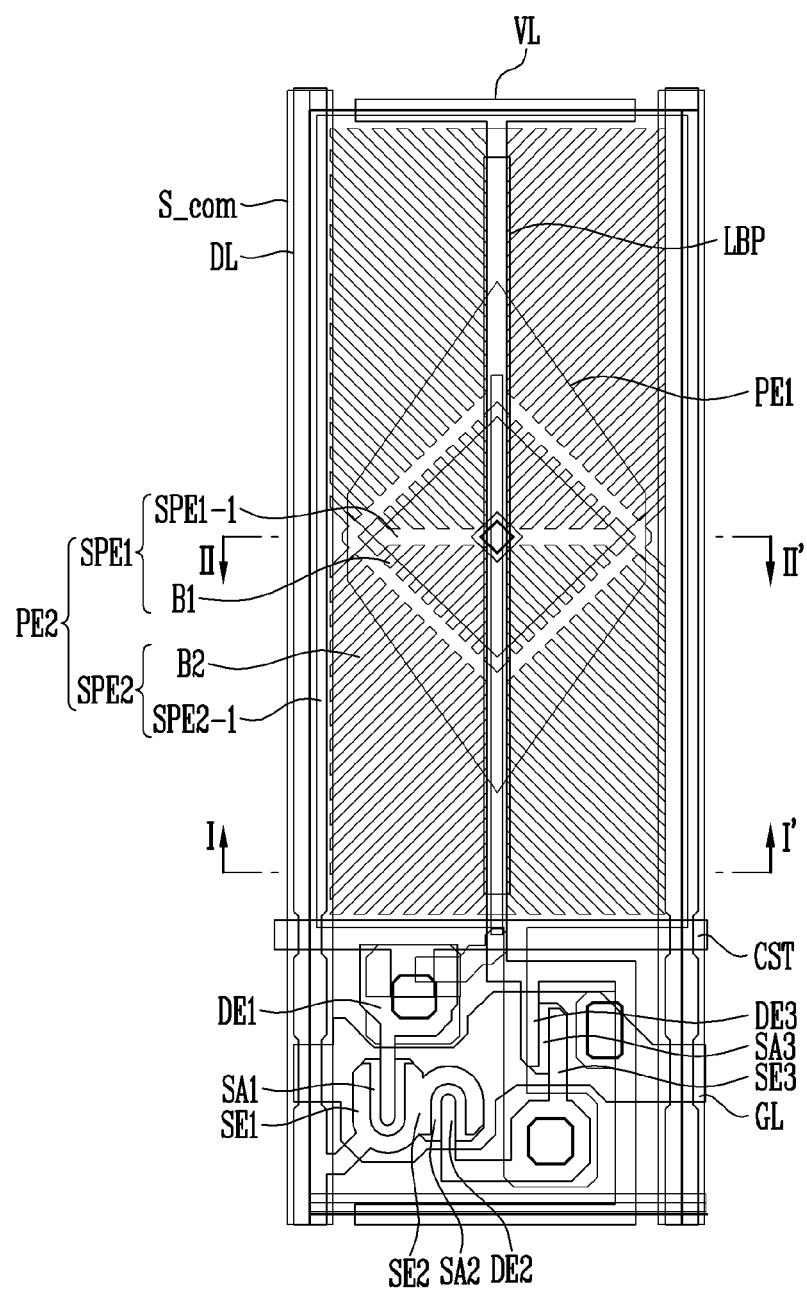
FIG. 2 is a plane view of an exemplary embodiment of a pixel of a display panel in the display device illustrated in FIG. 1.
Figure 3:
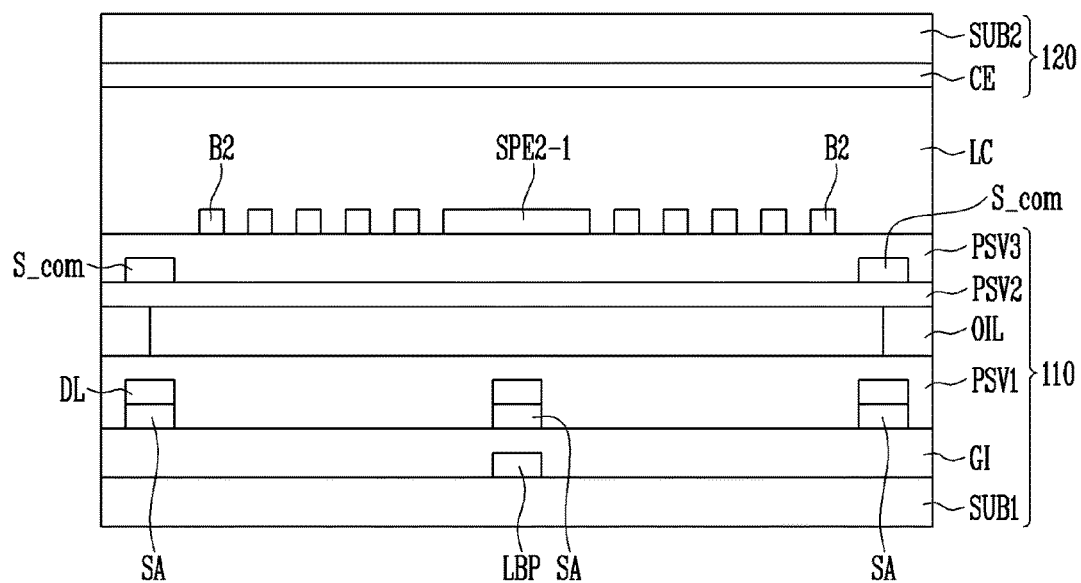
FIG. 3 is a cross-sectional view along line I-I' in FIG. 2.
Figure 4:
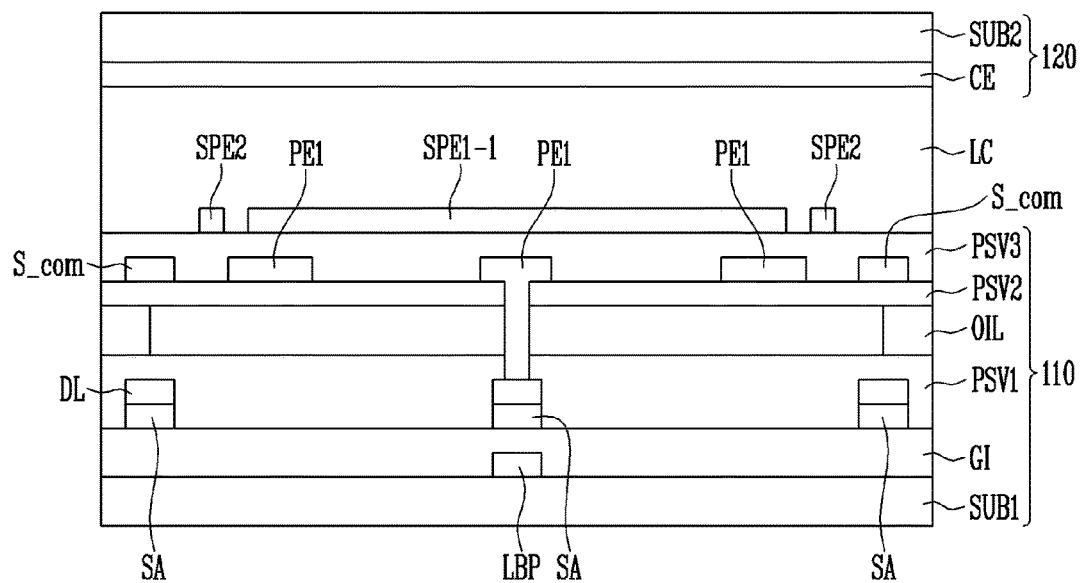
FIG. 4 is a cross-sectional view along line II-II' in FIG. 2.
Figure 5:
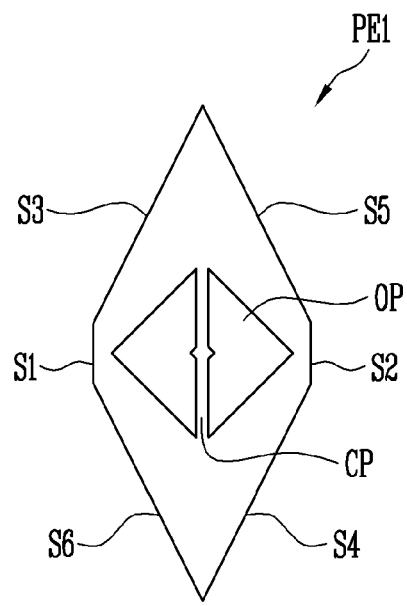
FIG. 5 is a plane view of an exemplary embodiment of a first pixel electrode in the pixel illustrated in FIG. 2.

FIG. 2 is a plane view of an exemplary embodiment of a pixel of a display panel in the display device illustrated in FIG. 1, FIG. 3 is a cross-sectional view along line I-I', FIG. 4 is a cross-sectional view along line II-II', and FIG. 5 is a plane view of an exemplary embodiment of a first pixel electrode in the pixel illustrated in FIG. 2.

Referring to FIGS. 2 to 5, the liquid crystal display panel 100 may include a first display substrate 110, a second display substrate 120 that faces the first display substrate 110, and an optical layer such as a liquid crystal layer LC disposed between the two display substrates 110 and 120.

The first display substrate 110 may be a thin film transistor array substrate in which thin film transistors for driving liquid crystal molecules of the liquid crystal layer LC are disposed.

The first display substrate 110 may include a first base substrate SUB1 on which is defined a pixel area. The first base substrate SUB1 may be a rigid type base substrate, or a flexible type base substrate. The rigid type base substrate may include one of a glass base substrate, quartz base substrate, glass ceramic base substrate and crystalline glass base substrate. The flexible type base substrate may include one of a film base substrate and plastic base substrate that includes disposed thereon a relatively high molecular organic substance. The substance applied to the first base substrate SUB1 may desirably have resistance (or thermal resistance) against relatively high processing temperatures during manufacturing and processing thereof.

On the first base substrate SUB1, a gate line GL may be arranged. The gate line GL may deliver a gate signal, and may be elongated to extend in a first direction. A portion of the gate line GL may be protruded from a main elongated portion in a direction different from the first direction to define first to third gate electrodes.

Furthermore, on the first base substrate SUB1, a light blocking pattern LBP may be elongated to extend in a second direction. Herein, the second direction may be a direction that crosses the first direction. The light blocking pattern LBP may include a same material or substance as the gate line GL and may be disposed in a same layer of the first display substrate 110 as the gate line GL and gate electrodes. The light blocking pattern LBP may be electrically insulated from the gate line GL.

On the gate line GL and the light blocking pattern LBP, a gate insulator GI may be arranged. The gate insulator GI) may include at least one of silicon oxide (SiOx) and silicon nitride (SiNx).

On the gate insulator GI, first to third semiconductor layers SA1, SA2 and SA3 may be arranged. Although not illustrated in the drawings, an ohmic contact layer may be respectively arranged on the first to third semiconductor layers SA1, SA2 and SA3.

On the gate insulator GI and the first to third semiconductor layers SA1, SA2 and SA3, a data line DL, reference voltage line VL, first to third source electrodes SE1, SE2 and SE3, and first to third drain electrodes DE1, DE2 and DE3 may be arranged. A thin film transistor may include a gate electrode, a source electrode, a drain electrode, a semiconductor layer and an ohmic contact layer. Therefore, in the illustrated exemplary embodiment, three thin film transistors may be connected to a gate line GL and a data line DL from among a plurality of gate lines GL and a plurality of data lines DL.

Furthermore, the data line DL may be elongated to extend in the second direction, and may be connected to an external driving circuit (not illustrated).

The reference voltage line VL may be elongated to extend in the second direction, and may overlap the light blocking pattern LBP in the plane (or top plan) view.

On the data line DL, the reference voltage line VL, the first to third source electrodes SE1, SE2 and SE3, and the first to third drain electrodes DE1, DE2 and DE3, a first protection film PSV1 may be arranged. The first protection film PSV1 may include at least one of silicon oxide (SiOx) and silicon nitride (SiNx).

On the first protection film PSV1, an organic insulating layer OIL may be arranged. The organic insulating layer OIL may planarize the layers disposed thereunder and have a planarized surface. Furthermore, the organic insulating layer OIL may be a color filter that includes dye. The color filter may be one of a red, green and blue color filter, but there is no limitation thereto. In an exemplary embodiment, for example, the color filter may be one of a cyan, magenta and yellow color filter.

On the organic insulating layer OIL, a second protection layer PSV2 may be arranged. The second protection film PSV2 may reduce or effectively prevent exposure of the organic insulating layer OIL. The second protection film PSV2 may include a same substance as the first protection film PSV1. That is, the second protection film PSV2 may include at least one of silicon oxide (SiOx) and silicon nitride (SiNx).

On the second protection film PSV2, a first pixel electrode PE1 and a shielding electrode S_com may be arranged. Herein, the first pixel electrode PE1 and the shielding electrode (S_com) may include a same material or substance and may be disposed in a same layer of the first display substrate 110 as each other. In an exemplary embodiment, for example, the first pixel electrode PE1 and the shielding electrode S_com may each include a transparent conductive oxide. The transparent conductive oxide may be one of indium tin oxide ("ITO"), indium zinc oxide ("IZO"), aluminum zinc oxide "AZO"), gallium doped zinc oxide ("GZO"), zinc tin oxide ("ZTO"), gallium tin oxide ("GTO") and fluorine doped tin oxide ("FTO").

The first pixel electrode PE1 may be connected to the first drain electrode DE through contact holes that penetrate the first protection film PSV1, the organic insulating layer OIL, and the second protection film PSV2.

The first pixel electrode PE1 may have a hexagon shape in the plane view.

Specifically, the first pixel electrode PE1 may include six sides S1, S2, S3, S4, S5 and S6. That is, the first pixel electrode PE1 may include a first side S1 and second side S2 that are each parallel to a side of the pixel area and elongated in an extension direction; a third side S3 and fourth side S4 that respectively extend from first ends of the first side S1 and the second side S2, are inclined with respect to the extension direction of the first side S1 and the second side S2 and are parallel to each other; and a fifth side S5 and sixth side S6 that respectively extend from second ends of the first side S1 and the second side S2 opposite to the first ends, are inclined with respect to the extension direction of the first side S1 and the second side S2, connect the first and second sides S1 and S2 with the third and fourth sides S3 and S4, and are parallel to each other. Each of the third to sixth sides S3, S4, S5 and S6 is elongated in an extension direction thereof.

Herein, a length in the extension direction of the third to sixth sides S3, S4, S5 and S6 may be greater than a length of the first and second sides S1 and S2 in the extension direction thereof.

Furthermore, an interior angle respectively formed between the third to sixth sides S3, S4, S5 and S6 and the first and second sides S1 and S2 may exceed about 135 degrees)(°. In an exemplary embodiment, for example, the interior angle respectively formed between the third to sixth sides S3, S4, S5 and S6 and the first and second sides S1 and S2 may be or more than about 145°.

The interior angle respectively formed between the third and fourth sides S3 and S4 and the fifth and sixth sides S5 and S6 may be less than about 90°. In an exemplary embodiment, for example, the interior angle respectively formed between the third and fourth sides S3 and S4 and the fifth and sixth sides S5 and S6 may be or less than about 70°.

Furthermore, the first pixel electrode PE1 may have defined therein a diamond shaped open are OP, and a connecting portion CP that traverses the open area OP. The connecting portion CP is elongated in the second direction and may overlap the reference voltage line VL.

The connecting unit CP may be connected to the reference voltage line VL through contact holes that penetrate the first protection film PSV1, the organic insulating layer OIL and the second protection film PSV2.

The shielding electrode S_com may overlap the data line DL, and be elongated to extend in the second direction. Widths taken perpendicular to the second (extension) direction of the shielding electrode S_com and the data line DL may be the same or may be different. In an exemplary embodiment, a width of the shielding electrode S_com may be larger than that of the data line DL, but the invention is not limited thereto. Edges of the overlapping shielding electrode S_com and data line DL may be aligned or offset (non-aligning) with each other. The shielding electrode S_com may overlap the data line DL and reduce or effectively prevent coupling between the data line DL of the first display substrate 110 and a common electrode CE of the second display substrate 120. Therefore, the shielding electrode S_com may reduce or effectively prevent abnormal behavior of liquid crystal molecules of the liquid crystal layer LC inside the pixel area. Furthermore, the shielding electrode S_com may increase a storage capacitance of the pixel area.

On the first pixel electrode PE1 and the shielding electrode S_com, a third protection film PSV3 may be arranged. That is, the third protection film PSV3 may cover the first pixel electrode PE1 and the shielding electrode S_com. Furthermore, the third protection film PSV3 may include a same substance as the first protection film PSV1. That is, the third protection film PSV3 may include at least one of silicon oxide (SiOx) and silicon nitride (SiNx).

On the third protection film PSV3, a second pixel electrode PE2 may be arranged. The second pixel electrode PE2 may include a same substance as the first pixel electrode PE1.

Furthermore, the second pixel electrode PE2 may have a shape of a plate in the plane view, and may cover almost an entirety of the pixel area. The second pixel electrode PE2 may include a first subpixel electrode SPE1 having a shape corresponding to the diamond-shaped open area OP, and a second subpixel electrode SPE2 disposed outside of the first subpixel electrode SPE1 in the plane view. The first subpixel electrode SPE1 and the second subpixel electrode SPE2 may be disposed separated from each other at a distance, such as having a gap defined therebetween.

An edge area of the first subpixel electrode SPE1 may overlap the first pixel electrode PE1. The first subpixel electrode SPE1 may include a cross-shaped stem SPE1-1 that includes a width stem elongated in the first direction and a length stem elongated in the second direction, and a plurality of first branch units B1 extending from the stem SPE1-1. Furthermore, the first subpixel electrode SPE1 may be connected to the first subpixel electrode PE1 through a contact hole that penetrates the third protection film PSV3.

By the cross-shaped stem SPE1-1, the first subpixel electrode SPE1 may be differentiated into four sub-regions. Furthermore, the first branches B1 may be arranged on the sub-regions. An acute angle respectively formed between the first branches B1 and the stem SPE1-1 may be about 35° to about 55°.

Furthermore, a second-direction width of the stem SPE1-1 may be about 20% to about 35% a second-direction length of the first and second sides S1 S2. The above-described second-direction dimensions control an electric field formed by the first pixel electrode PE1 and the second pixel electrode PE2. Especially, the electric field formed near areas of the first and second sides S1 and S2 has a different direction from the electric field formed in other areas, and thus a texture phenomenon that occurs due to the oriented direction of the liquid crystal molecules near areas of the first and second sides S1 and S2 being different from the oriented direction of the liquid crystal molecules in other areas may be reduced or effectively prevented.

An inner edge area of the second subpixel electrode SPE2 may overlap the first subpixel electrode PE1. The second subpixel electrode SPE2 may be distanced from the first subpixel electrode SPE1 and be arranged outside of the first subpixel electrode SPE1 in the plane view. Herein, the second subpixel electrode SPE2 may be connected to the second drain electrode DE2 through a contact hole that penetrates the first protection film PSV1, the organic insulating layer OIL, the second protection film PSV2 and the third protection film PSV3.

The second subpixel electrode SPE2 may include a circumference portion SPE2-1 corresponding to corners of a plate shape, and a plurality of second branches B2 that are elongated to extend from the circumference portion SPE2-1. The acute angle respectively formed between the second branches B2 and the circumference portion SPE2-1 may be about 35° to about 55°.

The second display substrate 120 faces the first display substrate 110. The second display substrate 120 may include a second base substrate SUB2 and the common electrode CE.

The second base substrate SUB2 may include a same substance as the first base substrate SUB1.

The common electrode CE may be arranged on the second base substrate SUB2. The common electrode CE may have a shape of a plate in the pixel area.

Furthermore, the common electrode CE may include a same substance as the first pixel electrode PE1 and the second pixel electrode PE2. That is, the common electrode CE may include a transparent conductive oxide.

Between the second base substrate SUB2 and the common electrode CE, an overcoat layer (not illustrated) may be arranged. The overcoat layer may be arranged on a surface of the second base substrate SUB2 facing the first display substrate 110. The overcoat layer may planarize a surface of the second base substrate SUB2.

The liquid crystal layer LC may include a plurality of liquid crystal molecules having dielectric anisotropy. The liquid crystal molecules may be arranged between the first display substrate 110 and the second display substrate 120. In an exemplary embodiment, for example, the liquid crystal molecules are vertically oriented liquid crystal molecules arranged in a direction vertical (e.g., perpendicular) to the two display substrates 110 and 120. When an electric field is applied between the first display substrate 110 and the second display substrate 120, the liquid crystal molecules rotate in a certain direction between the first display substrate 110 and the second display substrate 120, thereby transmitting or blocking light. Herein, the term 'rotate' used herein refers to the liquid crystal molecules lying in a direction horizontal (e.g., parallel) to the first display substrate 110 or the second display substrate 120. Otherwise, the liquid crystal molecules rotating may refer not only to the liquid crystal molecules actually rotating, but also to the orientation of the liquid crystal molecules being changed by the electric field.

Figure 6:
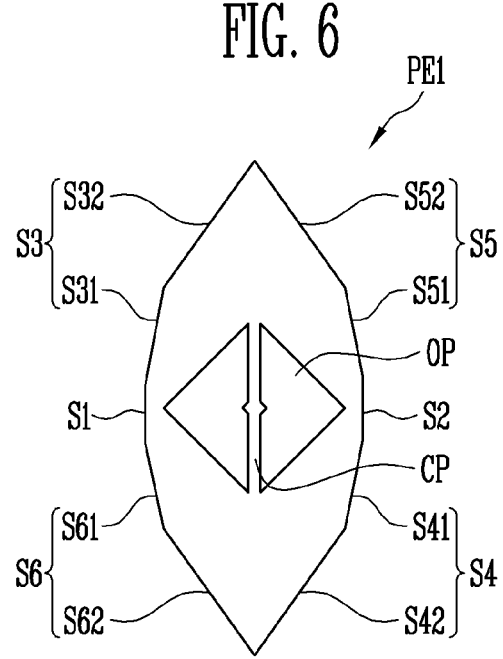
FIGS. 6 to 8 are plane views of other exemplary embodiments of a first pixel electrode according to the invention.
Figure 8:
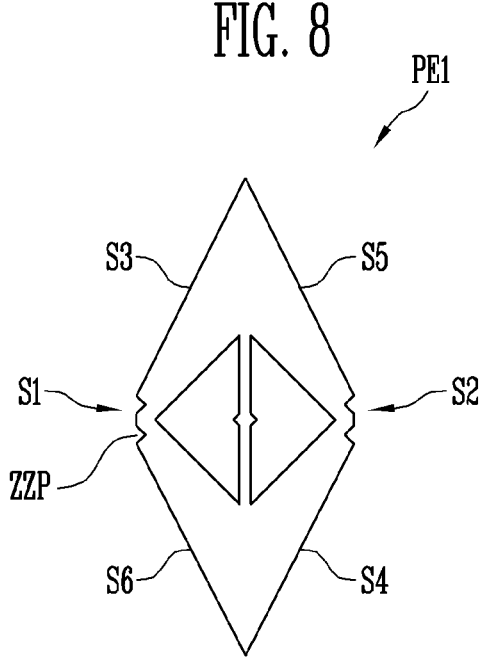

Hereinafter, other exemplary embodiments of the invention will be explained with reference to FIGS. 6 and 8. In FIGS. 6 and 8, the same reference numerals are used for the components that correspond to those of FIGS. 1 to 5, and thus further explanation thereof is omitted. Furthermore, in order to avoid redundancy of explanation, FIGS. 6 and 8 will be explained with a main focus on their differences from FIGS. 1 to 5.

FIG. 6 is a plane view of another exemplary embodiment of a first pixel electrode of a display device according to the invention.

Referring to FIG. 6, the first pixel electrode PE1 of the display device may include six sides S1, S2, S3, S4, S5 and S6. That is, the first pixel electrode PE1 may include a first side S1 and second side S2 that are each parallel to a side of the pixel area and elongated in an extension direction; a third side S3 and fourth side S4 that respectively extend from first ends of the first side S1 and the second side S2, are inclined with respect to the first side S1 and the second side S2 and are parallel to each other; and a fifth side S5 and sixth side S6 that respectively extend from second ends of the first side S1 and the second side S2 opposite to the first ends, are inclined with respect to the extension direction of the first side S1 and the second side S2, connect the first and second sides S1 and S2 with the third and fourth sides S3 and S4, and are parallel to each other. Each of the third to sixth sides S3, S4, S5 and S6 is elongated in an extension direction thereof.

Herein, the third to sixth sides S3, S4, S5 and S6 may include at least two sub-sides. Each of the sub-sides is elongated in an extension direction thereof.

In an exemplary embodiment, for example, the third to sixth sides S3, S4, S5 and S6 may respectively include first sub-sides S31, S41, S51 and S61 closest to the first side S1 and the second side S2, and second sub-sides S32, S42, S52 and S62 that are furthest from the first side S1 and the second side S2, among the sub-sides. The second sub-sides S32, S42, S52 and S62 are respectively connected to distal ends of the first sub-sides S31, S41, S51 and S61 relative to the first side S1 and the second side S2, and are each inclined with respect to extension directions of the first sub-sides S31, S41, S51 and S61.

Specifically, the first sub-sides S31 and S41 of the third and fourth sides S3 and S4 may be respectively elongated to extend from the first ends of the first and second sides S1 and S2 such that they are parallel to one another. Furthermore, the first sub-sides S31 and S41 of the third and fourth sides S3 and S4 may be respectively inclined with respect to extension directions of the first and second sides S1 and S2.

The second sub-sides S32 and S42 of the third and fourth sides S3 and S4 may be respectively elongated to extend from the distal ends of the first sub-sides S31 and S41 of the third and fourth sides S3 and S4 such that they are parallel to one another, and may be connected to the fifth and sixth sides S5 and S6, respectively. Furthermore, the second sub-sides S32 and S42 of the third and fourth sides S3 and S4 may be respectively inclined with respect to the first sub-sides S31 and S41 of the third and fourth sides S3 and S4.

The first sub-sides S51 and S61 of the fifth and sixth sides S5 and S6 may be respectively elongated to extend from the second ends of the first and second sides S1 and S2 such that they are parallel to one another. Furthermore the first sub-sides S51 and S61 of the fifth and sixth sides S5 and S6 may be respectively inclined with respect to extension directions of first and second sides S1 and S2.

The second sub-sides S52 and S62 of the fifth and sixth sides S5 and S6 may be respectively elongated to extend from the distal ends of the first sub-sides S51 and S61 of the fifth and sixth sides S5 and S6 such that they are parallel to one another, and may be connected to the second sub-sides S32 and S42 of the third and fourth sides S3 and S4.

In a plane view, an angle formed between the second sub-sides S32, S42, S52 and S62 and the first branches B1 and second branches B2 of the second pixel electrode PE2 may be about 90°.

An extension direction length of the first sub-sides S31, S41, S51 and S61 may be less than an extension direction length of the second sub-sides S32, S42, S52 and S62.

Figure 7:
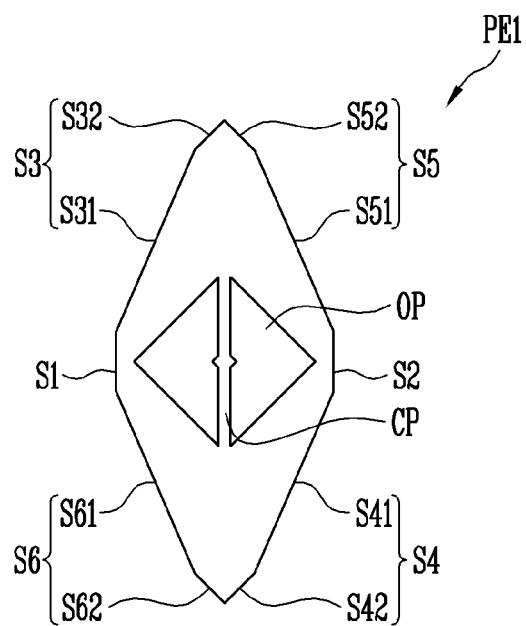

FIG. 7 is a plane view of another exemplary embodiment of a first pixel electrode of a display device according to the invention.

Referring to FIG. 7, the first pixel electrode PE1 of the display device may include six sides S1, S2, S3, S4, S5 and S6. That is, the first pixel electrode PE1 may include a first side S1 and second side S2 each parallel to a side of the pixel area and elongated in an extension direction; a third side S3 and fourth side S4 that respectively extend from first ends of the first side S1 and the second side S2, are inclined with respect to the first side S1 and the second side S2 and are parallel to each other; and a fifth side S5 and sixth side S6 that respectively extend from second ends of the first side S1 and the second side S2 opposite to the first ends, are inclined with respect to the extension direction of the first side S1 and the second side S2, connect the first and second sides S1 and S2 and the third and fourth sides S3 and S4 to each other and are parallel to each other. Each of the third to sixth sides S3, S4, S5 and S6 is elongated in an extension direction thereof.

Herein, the third to sixth sides S3, S4, S5 and S6 may include at least two sub-sides. Each of the sub-sides is elongated in an extension direction thereof.

In an exemplary embodiment, for example, the third to sixth sides S3, S4, S5 and S6 may include first sub-sides S31, S41, S51 and S61 closest to the first side S1 and the second side S2, and second sub-sides S32, S42, S52 and S62 that are furthest from the first side S1 and the second side S2, among the sub-sides. The second sub-sides S32, S42, S52 and S62 are respectively connected to distal ends of the first sub-sides S31, S41, S51 and S61 relative to the first side S1 and the second side S2, but are not parallel to the first sub-sides S31, S41, S51 and S61.

Specifically, the first sub-sides S31 and S41 of the third and fourth sides S3 and S4 may respectively elongated to extend from the first ends of the first and second sides S1 and S2 such that they are parallel to one another. Furthermore, the first sub-sides S31 and S41 of the third and fourth sides S3 and S4 may be respectively inclined with respect to the first and second sides S1 and S2.

The second sub-sides S32 and S42 of the third and fourth sides S3 and S4 may be respectively elongated to extend from the distal ends of the first sub-sides S31 and S41 of the third and fourth sides S3 and S4 such that they are parallel to one another, and may be connected to the fifth and sixth sides S5 and S6. Furthermore, the second sub-sides S32 and S42 of the third and fourth sides S3 and S4 may be respectively inclined with respect to the first sub-sides S31 and S41 of the third and fourth sides S3 and S4.

The first sub-sides S51 and S61 of the fifth and sixth sides S5 and S6 may be respectively elongated to extend from the second ends of the first and second sides S1 and S2 such that they are parallel to one another. Furthermore, the first sub-sides S51 and S61 of the fifth and sixth sides S5 and S6 may be respectively inclined with respect to the first and second sides S1 and S2.

The second sub-sides S52 and S62 of the fifth and sixth sides S5 and S6 may be respectively elongated to extend from the distal ends of the first sub-sides S51 and S61 of the fifth and sixth sides S5 and S6 such that they are parallel to one another, and may be connected to the second sub-sides S32 and S42 of the third and fourth sides S3 and S4.

An extension direction length of the first sub-sides S31, S41, S51 and S61 may be greater than an extension direction length of the second sub-sides S32, S42, S52 and S62.

FIG. 8 is a plane view of another exemplary embodiment of a first pixel electrode of a display device according to the invention.

Referring to FIG. 8, the first pixel electrode PE1 of the display device may include six sides S1, S2, S3, S4, S5 and S6. That is, the first pixel electrode PE1 may include a first side S1 and second side S2 each parallel to a side of the pixel area and elongated in an extension direction; a third side S3 and fourth side S4 that respectively extend from first ends of the first side S1 and the second side S2, are inclined with respect to the first side S1 and the second side S2, and are parallel to each other; and a fifth side S5 and sixth side S6 that that respectively extend from second ends of the first side S1 and the second side S2 opposite to the first ends, are inclined with respect to the extension direction of the first side S1 and the second side S2, connect the first and second sides S1 and S2 and the third and fourth sides S3 and S4 with each other and are parallel to each other. Each of the third to sixth sides S3, S4, S5 and S6 is elongated in an extension direction thereof.

Herein, the first and second sides S1 and S2 may each have a zig-zag pattern portion ZZP. A plurality of recesses may be defined extended from a plane of the first and second sides S1 and S2 to define the zig-zag pattern portion ZZP. The zig-zag pattern portion ZZP may be included in any of the exemplary embodiments illustrated in FIGS. 5 to 7.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular exemplary embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the invention as set forth in the following claims.

What is claimed is:

1. A display device comprising:
   a first display substrate comprising:
      a pixel area;
      a first pixel electrode on the pixel area; and
      a second pixel electrode overlapping the first pixel electrode;
   a second display substrate comprising a common electrode and facing the first display substrate; and
   a liquid crystal layer between the first display substrate and the second display substrate,
   wherein the first pixel electrode comprises:
      first and second sides elongated parallel to a first side of the pixel area;
      third and fourth sides respectively elongated to extend from first ends of the first and second sides, and inclined with respect to the first and second sides, the third and fourth sides parallel to each other;
      fifth and sixth sides connecting the second and first sides with the third and fourth sides, respectively, the fifth and sixth sides parallel to each other; and
      an open area which is defined inside the first pixel electrode and spaced apart from each of the first to sixth sides thereof,
   wherein an interior angle between each of the third to sixth sides, with respect to the first and second sides, exceeds about 135 degrees,
   wherein the second pixel electrode comprises:
      a first subpixel electrode overlapping the open area defined in the first pixel electrode; and
      a second subpixel electrode separated from and surrounding the first subpixel electrode to be spaced apart from the first subpixel electrode, wherein the second pixel electrode has a plate shape overlapping the pixel area, and
   wherein the first pixel electrode overlaps with a portion of the first sub pixel electrode and a portion of the second sub pixel electrode.

2. The display device according to claim 1,
further comprising:
a data line elongated parallel to the first side of the pixel area; and
a shielding electrode overlapping the data line, wherein the shielding electrode comprises a same material as the first pixel electrode.

3. The display device according to claim 2,
wherein lengths of the third to sixth sides are greater than lengths of each of the first and second sides.

4. The display device according to claim 3,
wherein the interior angle between each of the third to sixth sides, with respect to the first and second sides, is or more than about 145 degrees.

5. The display device according to claim 4,
wherein in a plan view, the open area defined inside the first pixel electrode and spaced apart from each of the first to sixth sides thereof has a diamond shape.

6. The display device according to claim 1, wherein in the plan view,
the first and second subpixel electrodes separated from each other respectively define edges in an edge area thereof, the edge areas of the first and second subpixel electrodes facing each other, and
the edge area of the first subpixel electrode of the second pixel electrode overlaps the first pixel electrode.

7. The display device according to claim 6,
wherein the first subpixel electrode of the second pixel electrode comprises:
a cross-shape stem; and
a plurality of first branches extending from the cross-shape stem, distal ends of the plurality of first branches defining the edges in the edge area of the first subpixel electrode,
wherein an acute angle between the first branches and the cross-shape stem is about 35 degrees to about 55 degrees.

8. The display device according to claim 7,
wherein a width of the stem in a direction perpendicular to an elongation direction thereof is about 20% to about 35% of a length of the first and second sides in elongation directions thereof.

9. The display device according to claim 8,
wherein the edge area of the second subpixel electrode which faces the edge area of the first subpixel electrode overlaps the first pixel electrode.

10. The display device according to claim 9, wherein the second subpixel electrode comprises:
a circumference portion having a plate shape; and
a plurality of second branches extending from the circumference portion.

11. The display device according to claim 10,
wherein an acute angle between the second branches and the circumference portion is about 35 degrees to about 55 degrees.

12. The display device according to claim 10,
wherein an interior angle between the third and fourth sides, with respect to the fifth and sixth sides connected thereto, is about 70 degrees or less.

13. The display device according to claim 12,
wherein each of the third to sixth sides comprises two sub-sides.

14. The display device according to claim 13, wherein first sub-sides of the third and fourth sides respectively extend from first ends of the first and second sides and are parallel to one another,
first sub-sides of the fifth and sixth sides respectively extend from second ends of the first and second sides opposite to the first ends thereof and are parallel to one another,
second sub-sides of the third and fourth sides respectively extend from distal ends of the first sub-sides of the third and fourth sides and are parallel to one another, the second sub-sides of the third and fourth sides respectively connected to the fifth and sixth sides, and
second sub-sides of the fifth and sixth sides respectively extend from distal ends of the first sub-sides of the fifth and sixth sides and are parallel to one another, the second sub-sides of the fifth and sixth sides respectively connected to the third and fourth sides.

15. The display device according to claim 11,
wherein the first and second sides have a zig-zag pattern defined therein.

16. A display device comprising:
a first display substrate comprising:
a pixel area;
a gate line on a first base substrate;
a data line crossing the gate line and insulated from the gate line;
a plurality of thin film transistors connected to the gate line and the data line;
a first protection film covering the thin film transistors;
a first pixel electrode on the protection film, and connected to a first thin film transistor among the plurality of thin film transistors;
a shielding electrode on the protection film, and overlapping the data line;
a second protection film overlapping the first pixel electrode and the shielding electrode; and
a second pixel electrode on the second protection film, connected to a second thin film transistor different from the first thin film transistor among the plurality of thin film transistors;
a second display substrate comprising a common electrode and facing the first display substrate; and
a liquid crystal layer between the first display substrate and the second display substrate,
wherein the first pixel electrode comprises:
first and second sides elongated parallel to a first side of the pixel area;
third and fourth sides respectively elongated to extend from first ends of the first and second sides, inclined with respect to the first and second sides, the third and fourth sides parallel to each other;
fifth and sixth sides connecting the second and first sides with the third and fourth sides, respectively, the fifth and sixth sides parallel to each other; and
an open area which is defined inside the first pixel electrode and spaced apart from each of the first to sixth sides thereof,
wherein an interior angle between each of the third to sixth sides, with respect to the first and second sides, exceeds about 135 degrees,
wherein the second pixel electrode comprises:
a first subpixel electrode overlapping the open area defined in the first pixel electrode; and
a second subpixel electrode separated from and surrounding the first sub-pixel electrode to be spaced apart from the first subpixel electrode, wherein the second pixel electrode has a plate shape overlapping the pixel area, and wherein the first pixel electrode overlaps with a portion of the first sub pixel electrode and a portion of the second sub pixel electrode.

17. The display device according to claim 16,
wherein an interior angle between each of the third and sixth sides, with respect to the first and second sides, is or more than about 145 degrees.

18. The display device according to claim 17,
wherein the open area defined in the first pixel electrode and spaced apart from each of the first to sixth sides thereof has a diamond shape.

\* \* \* \* \*